United States Patent
Damask et al.

(10) Patent No.: US 6,252,711 B1
(45) Date of Patent: Jun. 26, 2001

(54) POLARIZATION DIVERSITY FOR BIREFINGENT FILTERS

(75) Inventors: Jay N. Damask, Annapolis, MD (US); Christopher Richard Doerr, Middletown Township, NJ (US)

(73) Assignee: Lucent Technologies, Inc, Murray Hill, NJ (US)

( * ) Notice: Subject to any disclaimer, the term of this patent is extended or adjusted under 35 U.S.C. 154(b) by 0 days.

(21) Appl. No.: 09/532,143

(22) Filed: Mar. 21, 2000

(51) Int. Cl.[7] .............................. G02B 27/28; H04J 14/00
(52) U.S. Cl. ..................... 359/498; 359/495; 359/497; 359/900; 359/115; 359/122; 359/124
(58) Field of Search .................. 359/494, 495, 359/496, 497, 498, 122, 124, 127, 129, 115; 385/11

(56) References Cited

U.S. PATENT DOCUMENTS

| | | | |
|---|---|---|---|
| 4,973,124 | * 11/1990 | Kaede | 359/127 |
| 4,987,567 | 1/1991 | Buhrer | 359/498 |
| 5,606,439 | * 2/1997 | Wu | 385/31 |
| 5,867,291 | * 2/1999 | Wu et al. | 359/124 |
| 5,912,748 | * 6/1999 | Wu et al. | 359/117 |
| 6,163,393 | * 12/2000 | Wu et al. | 359/127 |

* cited by examiner

*Primary Examiner*—Cassandra Spyrou
*Assistant Examiner*—John Juba, Jr.
(74) *Attorney, Agent, or Firm*—John A. Caccuro

(57) ABSTRACT

A birefringent filter includes an input optical apparatus for receiving an input optical beam and producing therefrom parallel first and second optical beams offset in a first direction and having the same polarization. A birefringent filter unit receives the first and second polarized optical beams and produces a first and second elliptically polarized optical beams. An output optical apparatus combines predetermined components of the first and second elliptically polarized optical beams to form a first and second elliptical polarized output beams. The two output beams have intensities that vary inversely, in a periodic manner, as a function of frequency of the input optical beam.

20 Claims, 14 Drawing Sheets

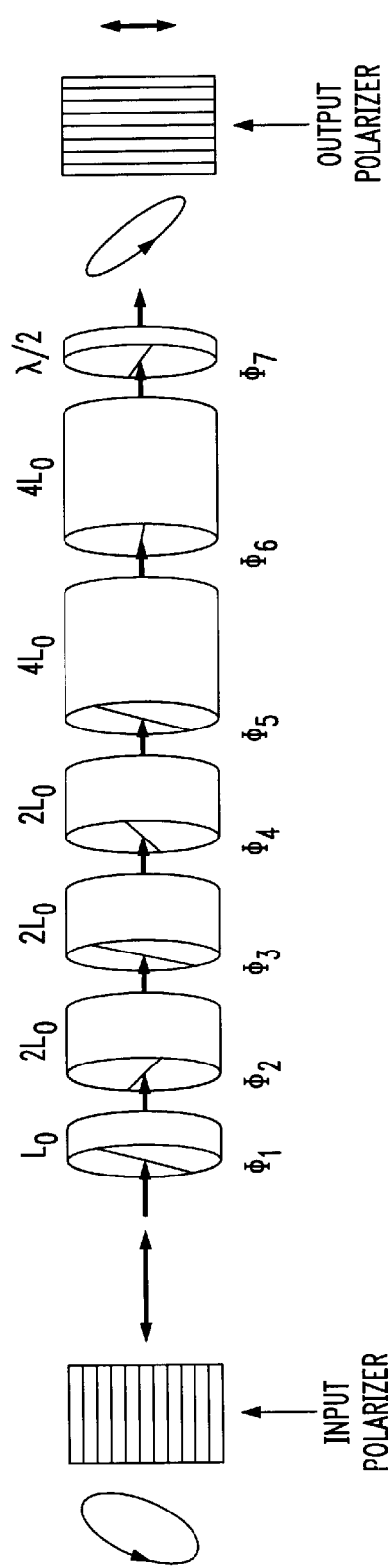
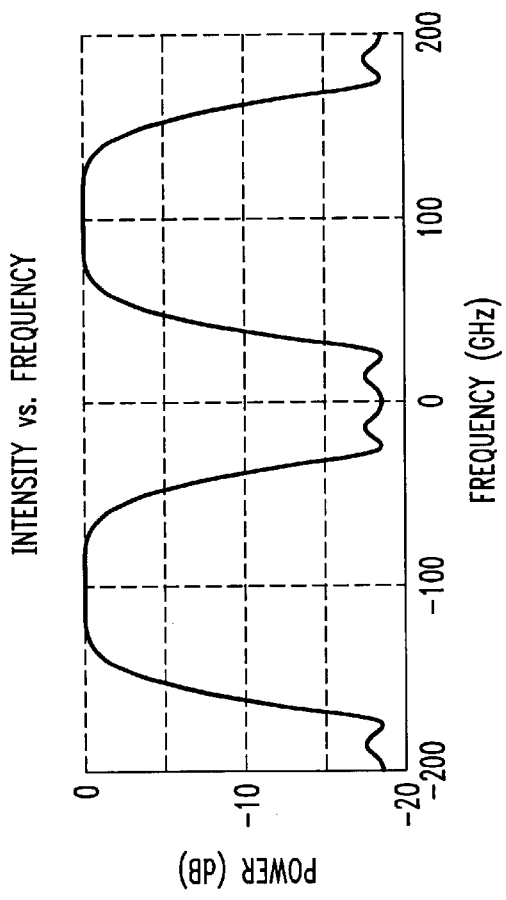
FIG. 1A
PRIOR ART

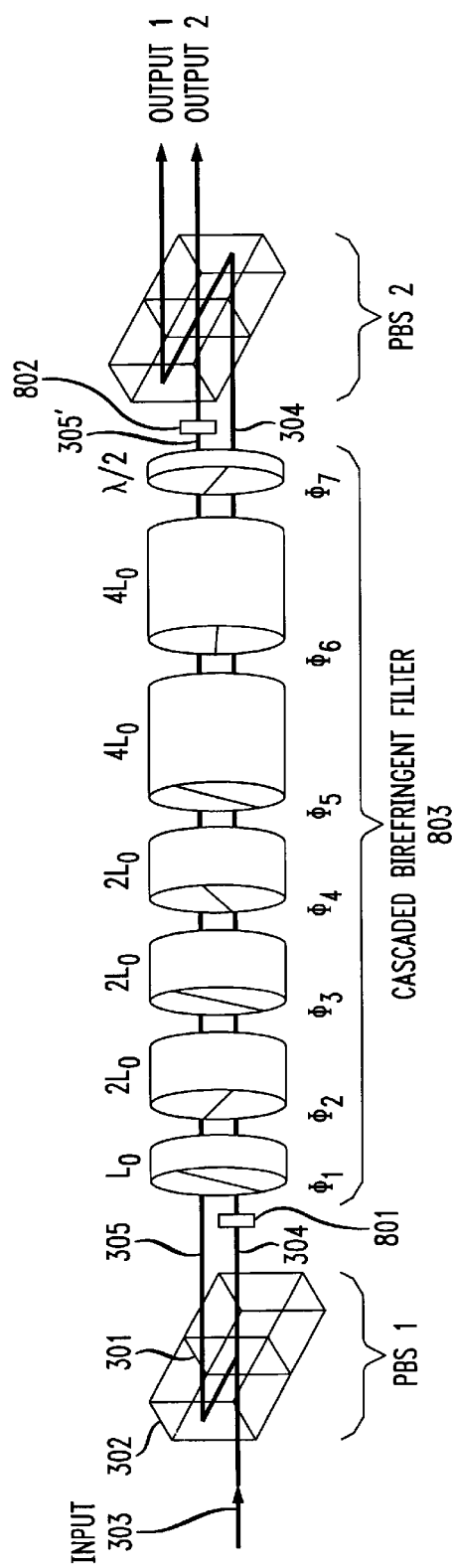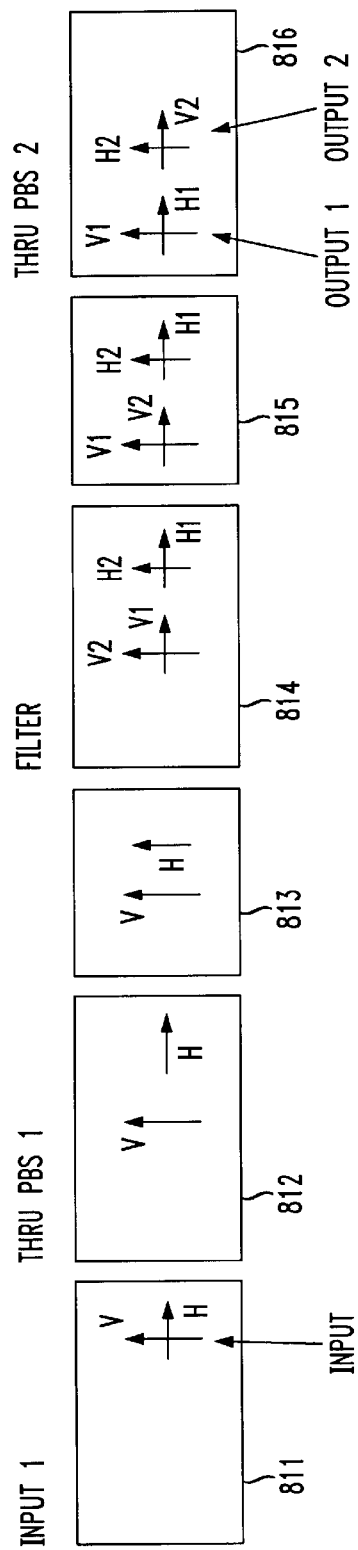

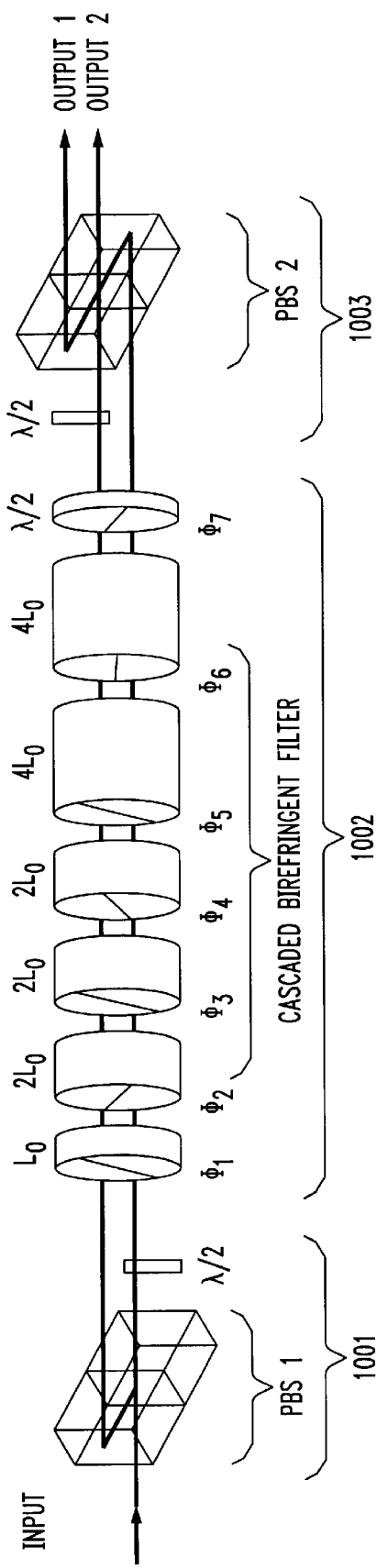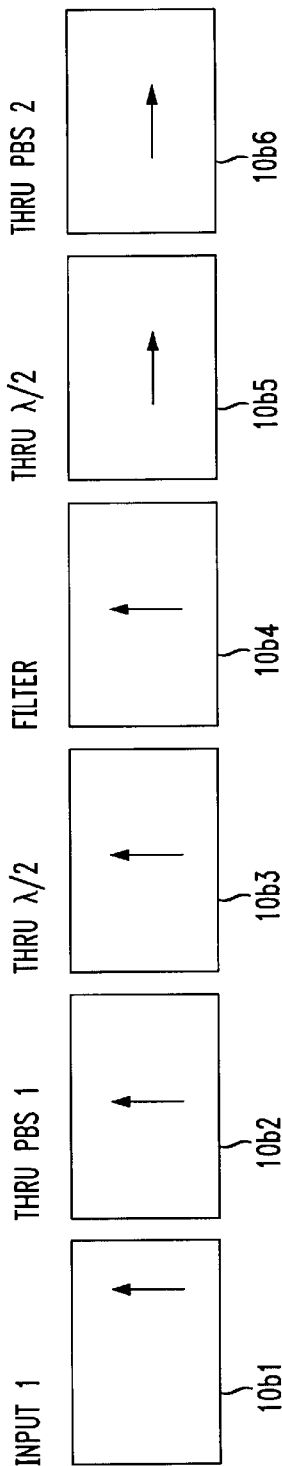

POLARIZATION DIVERSITY FOR BIREFINGENT FILTERS

CROSS-REFERENCE TO RELATED APPLICATIONS

Related subject matter is disclosed the concurrently filed application entitled "DOUBLE-PASS POLARIZATION DIVERSIFIED BI REFRINGENT FILTER" by J. N. Damask and C. R. Doerr, which is assigned to the same Assignee.

FIELD OF THE INVENTION

The invention relates generally to birefringent filters and, more particularly, to an improved birefringent interleaving filter for separating even and odd channels of a wavelength division multiplexed signal.

BACKGROUND OF THE INVENTION

The birefringent filter was first developed by astronomers at the turn of the century so that they could make celestial observations of the Sun through a narrow-band spectral window. The classic papers on these filters were written by Loyt [1] Evans [2] and Solc [3]. (Note in this specification, a reference to another document is designated by a number in brackets to identify its location in a list of references found in the Appendix) In 1965 Harris et al [4] published a method of filter synthesis for the birefringent filter. In the late 1980s, Buhrer [5] brought the birefringent filter into the optical communications world with his demonstration of such a filter designed for optical wavelength multiplexing and demultiplexing.

The filters built by Lyot, Evans, and Solc, FIG. 1a used polarizers placed before and after the birefringent filter proper to isolate one polarization state at the input and then discriminate the state of polarization at the output of the filter. This was sufficient for their application because the Sun is an intense source and the polarization of light from the Sun is completely random.

In the late 1980s, Buhrer recognized that the use of input and output polarizers created excessive polarization-dependent loss and was therefore unsuitable for telecommunication applications. He instead created a method for polarization diversity. New input and output stages were proposed to allow the birefringent filter to handle simultaneously two orthogonal polarizations and to allow the output of the filter to couple to two complimentary ports. In his scheme, there is no loss of light, regardless of polarization. Buhrer U.S. Pat. No. 4,987,567 [6] further describes the use of a birefringent filter as an optical signal multiplexer/demultiplexer.

This invention makes material improvements to the Buhrer scheme for polarization diversity at the input and output of a birefringent filter. This invention increases the isolation between signals and decreases the chromatic dependence.

SUMMARY OF THE INVENTION

Our improved polarization diversity for birefringent filter implementation offers a decreased polarization sensitivity and an increased crosstalk rejection over prior art implementations and offers low insertion loss, high contrast, and low chromatic dispersion. As such, our birefringent filter with improved polarization diversity may be used as an interleaving filter to separate even and odd channels of a wavelength division multiplexed signal.

In accordance with the present invention, a birefringent filter apparatus comprises (1) an input optical apparatus for receiving an input optical beam and producing therefrom parallel first and second polarized optical beams offset in a first direction and having the same polarization; (2) a birefringent filter for receiving the first and second polarized optical beams and producing therefrom a first and second elliptically polarized optical beams, each including first and second orthogonal beam components having inversely varying intensities which vary periodically, over a predefined free-spectral range, with the frequency of the input optical beam; and (3) an output optical apparatus for receiving the first and second elliptically polarized optical beams and for combining together the first beam components of the first and second elliptically polarized optical beams to form a first elliptical polarized output beam and for combining together the second beam components of the first and second elliptically polarized optical beams to form a second elliptical polarized output beam.

In one embodiment, the input optical apparatus includes a birefringent beam displacer and a $\lambda/2$ plate and the output optical apparatus includes a first beam displacer, a two-by-two $\lambda/2$ plate, and a second beam displacer. In a second embodiment, the input optical apparatus includes a first beam displacer, a two-by-two $\lambda/2$ plate, and a second beam displacer and the output optical apparatus includes a first beam displacer, a two-by-two $\lambda/2$ plate, and a second beam displacer. In a third embodiment, the input optical apparatus includes a polarized beam-splitter (PBS) and a $\lambda/2$ plate and the output optical apparatus includes a $\lambda/2$ plate and a PBS.

BRIEF DESCRIPTION OF THE DRAWING

In the drawings

FIG. 1a shows a prior art illustration of a cascaded birefringent filter with input and output polarizers, as used by early astronomers;

FIG. 5 shows the de-interleaving of a wavelength division multiplexed (WDM) signal by our periodic birefringent interleaver filter of FIG. 4a;

FIG. 8a shows a second inventive implementation of a periodic birefringent interleaving filter and FIG. 8b shows a stick diagram illustrating beam locations and the relative beam intensity along the two polarization axes at various locations of the filter in response to a single input signal;

FIGS. 9a–9d illustratively add the temporal, and therefore phase, information to the Buhrer birefringent filter arrangement of FIG. 3a; and FIGS. 10a–10d illustratively add the temporal, and therefore phase, information to our birefringent filter arrangement of FIG. 4a.

DETAILED DESCRIPTION

FIG. 1a is an illustration of the original type of cascaded birefringent filter. An input polarizing sheet linearly polarizes the incoming light. The cascade of birefringent crystals, cut and oriented as waveplates, rotates the state-of-polarization (SOP) as a function of frequency. The output polarizer, as drawn, discriminates the SOP power as projected on a vertical axis from that projected on the horizontal axis. In this manner, the intensity of the output light is modulated as a function of frequency. An illustrative Intensity versus Frequency response characteristic is also shown.

Figure 1B:
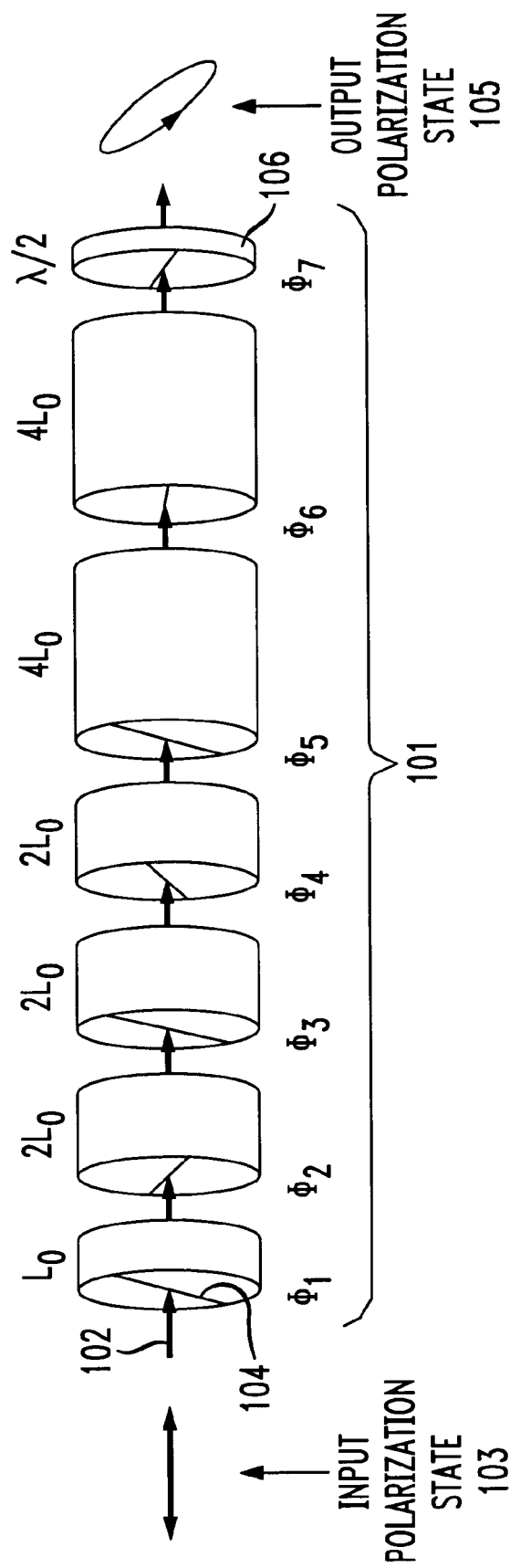
FIG. 1b shows a prior art illustration of a cascaded birefringent filter.

FIG. 1b is an illustration of the same original filter type but without the input and output polarizers. One or more plates of birefringent filter 101 cut and oriented as waveplates are placed one behind the other. Typical uniaxial birefringent materials are mica, calcite, rutile, yttrium orthovanadate, alpha-Barium Borate, and Lithium niobate. The thickness of each plate, $L_0$–$4L_0$, is either a unit thickness or an integral-multiple of the unit thickness. Illustratively, for a 200 GHz free-spectral-range of the cascaded filter at 1.545 μm, the thinnest plate must be about 8.8 mm long if made with calcite.

A uniaxial birefringent crystal exhibits two natural indices of refraction oriented perpendicular to one another. One axis is called the fast axis while the other axis is called the slow axis, where fast and slow refer to the smaller and larger indices of refraction, respectively. The axes of the plates are oriented so that the plane that contains the fast and slow axes is perpendicular to the path 102 of the incident optical beam 103. In this orientation, the crystal acts as a waveplate. The azimuth rotation, e.g., 104, of each plate in 101 depends on the filter synthesis procedure as described in the prior art. With a linearly polarized input signal 103, one or more uniaxial birefringent crystals produces, in general, an elliptical polarized output signal 105. An optional half-waveplate 106 at the end of the cascade rotates the filter output state-of-polarization (SOP) into the axis of the output stage (output stage not shown here).

Figure 2A:
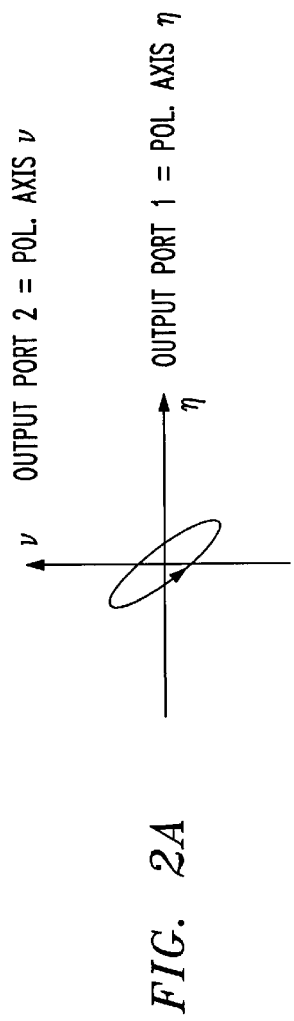
FIG. 2a shows, for the cascaded birefringent filter of FIG. 1, the output polarization signal at two linear orthogonal axes, υ and η, in response to a linearly polarized input signal

FIG. 2a shows the projection of output state-of-polarization, 105 of FIG. 1, onto two linear orthogonal axes, υ and η. The frequency response of the filter manifests itself as the division of power between two linear orthogonal polarization axes, υ and η, which serve as the output "ports" of the birefringent filters of FIG. 1b.

Figure 2B:
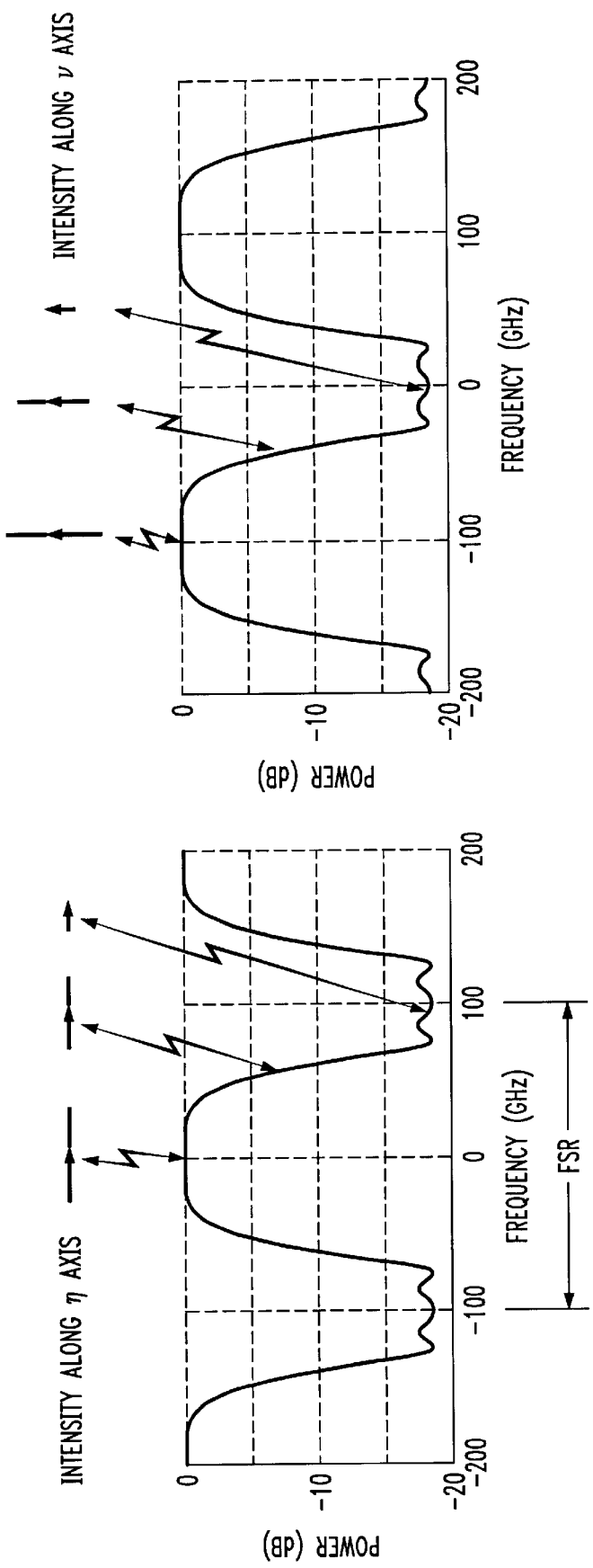
FIG. 2b shows the relative intensity variation along the η and υ polarization axes with frequency.

As shown in FIG. 2b, the relative beam intensities along the υ axis and the η axes are indicated by the length of the arrows above the frequency response curves. The filter of FIG. 1 is periodic with a free-spectral-range (FSR) equal to the FSR of the thinnest plate, $L_0$ in FIG. 1. As shown, the intensity along the υ and η axes vary in a complimentary manner such that the sum of the two intensities at all frequencies remains constant. FIG. 2b illustrates one possible filter response, where over a first frequency band (centered at relative 0 GHz) the intensity on the η axis is near maximum and the intensity along the U axis is near minimum, while over a second frequency band (centered at relative +/−100 GHz) the intensity on the η axis is near minimum and the intensity along the υ axis is near maximum. The intensity response is periodic with frequency and the shape of the response is the result of the filter plate orientations 101. While one plate gives a cosine-squared response, a cascade of plates can create a sharper filter characteristic.

A necessary step to make the birefringent filter of FIG. 1 suitable as an interleaving filter for optical telecommunications applications is to construct a means to spatially separate the optical output power on the two orthogonal polarization axes, υ and η, onto two distinct output ports.

Polarization Diversity of Prior Art

Figure 3A:
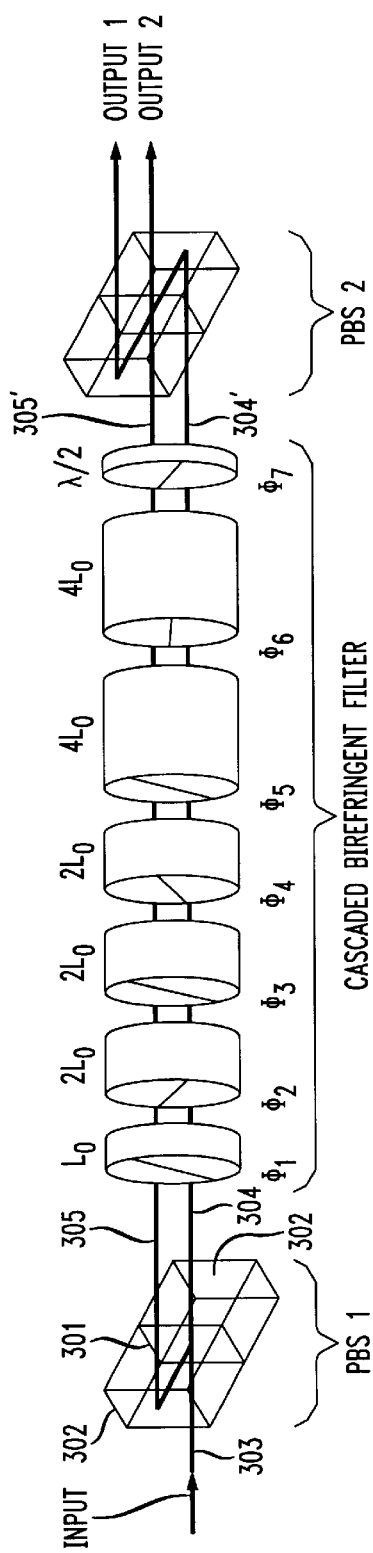
FIG. 3a shows an illustration of a prior art birefringent filter of U.S. Pat. No. 4,987,567

The extension of the classic birefringent filter illustrated in FIG. 1 to optical communication systems necessitates that the power on either output port be independent of the state-of-polarization at the input. Frequency alone must be the only discriminator. A means for polarization diversity is essential. In U.S. Pat. No. 4,987,567 [6] issued to Buhrer there is described a means for polarization diversity, where a polarization beam-splitter (PBS) and mirror combination placed at the input and output is employed, as shown in FIG. 3a. The input stage PBS 1 and output stage PBS 2 are made with a specially designed polarizing beam splitter (PBS). For this PBS, two 45-degree tilted rhombuses are used rather than the conventional two right triangles. The interface 301 uses a specially designed multi-layer dielectric film located between the rhombuses to split the input polarization in the same fashion as a PBS. The two rhombus faces 302 that are parallel to this interface 301 are mirror coated. In this way, the input beam 303 is aligned to the interface 301 and the interface separates the two polarizations. One polarization 304 continues through the interface 301 while the other polarization reflects towards the opposing mirror-coated rhombus face 302. The reflection from this mirror redirects the beam to run parallel 305 yet offset from the first beam 304. Together, this action achieves polarization separation by the creation of two parallel output beams 304 and 305.

Figure 3B:
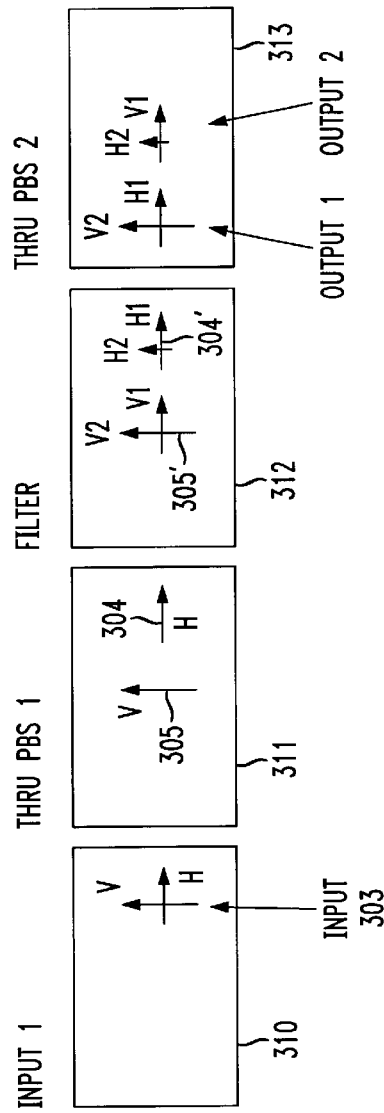
FIG. 3b shows a stick diagram illustrating beam locations and relative beam intensity along along the η and υ polarization axes at various locations of the filter in response to an input beam.

FIG. 3b illustrates stick diagrams that indicate the polarization and spatial evolution as the beam 303 passes through the filter of FIG. 3a. At the input, beam 303 in general possesses two orthogonal polarization components, V and H in 310. The effect of PBS 1 is to spatially separate V from H onto two distinct beams 304 and 305, frame 311. In general, transmission through the cascaded birefringent filter transforms the linear polarization states V and H to elliptical states, depending on the optical frequency of the light. Frame 312 illustrates the output of the cascaded birefringent filter with polarization components V1 and V2 on beam 305', and polarization components H1 and H2 on beam 304'. V1 and H1 represent the horizontal η polarization components, and V2 and H2 represent the vertical ν polarization components. While V1 is horizontal and H2 is vertical, the use of the notation 'V1' and 'H2' is to indicate the origin of these components rather than their absolute SOP with respect to the input.

While PBS 1 separated the two incoming polarization states onto two distinct beams, PBS 2 must combine the appropriate polarization components from beams 304' and 305' to form two complimentary output ports, Output 1 and Output 2, frame 313. PBS 2 is positioned so that beam 305' intersects the interface 301 on PBS 2 while beam 304' reflects from the mirror coated surface 302 on PBS 2. PBS 2 then combines polarization components V2 and H1 onto Output 1, and combines polarization components V1 and H2 onto Output 2. With the apparatus described, the desired performance is achieved, where the output beam intensity is a function only of the input optical frequency and not the state of polarization.

Prior Art Problems and Improvements

The Buhrer method appears to have a satisfactory performance; yet the imperfections present in the PBS components result in both a low contrast ratio between polarization states and polarization-dependent loss (PDL). Accordingly, the practical implementation suffers from crosstalk and PDL impairments.

In accordance with the present invention, we describe an alternative polarization-diversified birefringent filter, shown in FIG. 4. Our method of polarization diversity can provide an order-of-magnitude improvement in the contrast of polarization separation over that provided by the PBS input and output stages used by Buhrer, and a reduction in PDL. The PBS stages typically yield only 27 dB contrast between the two output orthogonal linear polarizations. The 27 dB contrast of the PBS stages occurs because of the limited ability to fabricate a dielectric stack at the PBS interface 301 which is sufficiently polarization sensitive, achromatic, and low loss. Moreover, typically the transmission and reflection of the two orthogonal polarization states at the dielectric interface 301 is asymmetric. An example with currently available PBS components is a transmission of ~95% and a reflection of ~99%. Such asymmetry produces PDL.

Using our technique of implementing the input and output stages of birefringent material yields better than 40 dB contrast. The 40 dB polarization contrast is due to the natural birefringence of the crystal itself rather than an engineered dielectric. Moreover, the asymmetry of the polarization separation is in excess of 10 dB better than the PBS, reducing PDL impairments.

High Contrast Input/Output Stages for a 1×2 Birefrigent Filter Design

Figure 4A:
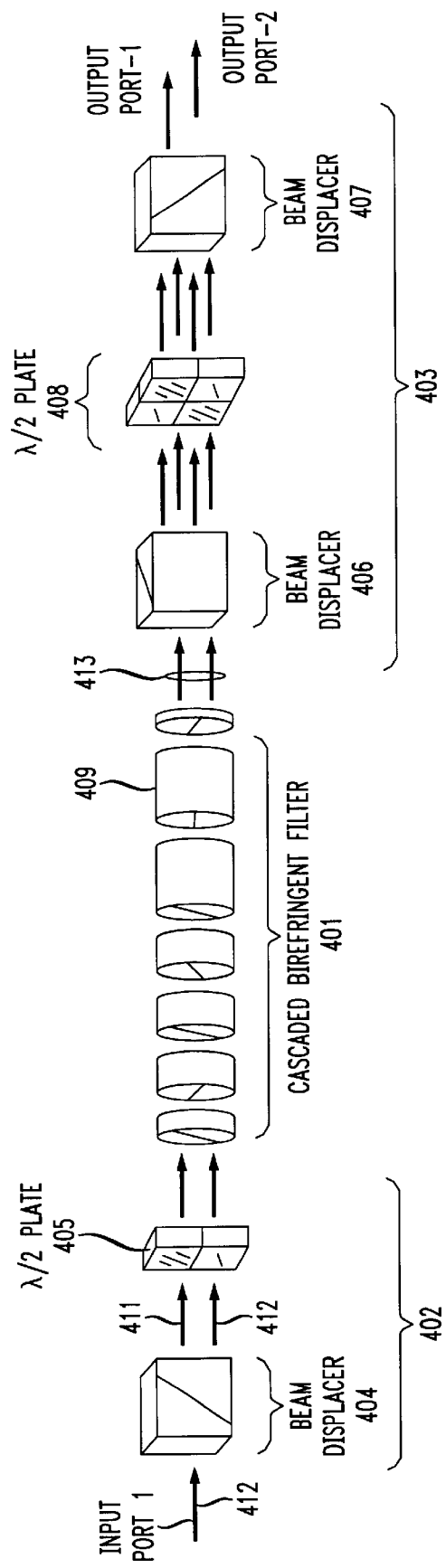
FIG. 4a shows a first inventive implementation of a periodic birefringent interleaver filter and FIG. 4b shows a stick diagram illustrating beam locations and the relative beam intensity along the two polarization axes at various locations of the filter in response to a single input beam.

FIG. 4a illustrates our filter design as used in a polarization-insensitive 1-port to 2-port configuration. The figure uses the same birefringent filter 401 as in FIG. 3 but replaces the input and output PBS elements with our input 402 and output 403 optical units. The input unit 402 includes a beam displacer 404 and a $\lambda/2$ plate 405. The output unit 403 includes two beam displacers 406 and 407 and a "checkerboard" $\lambda/2$ plate 408. The beam displacers are made with a birefringent material such as calcite or rutile. The orientation of the crystal cut of the beam displacers 404, 406, and 407 is different from that of the birefringent plates 409 used to make the filter 401. Rather than the extraordinary axis of the plates 409 lying on the plane perpendicular to the path of the light 410, the orientation of the extraordinary axis for the beam displacers intersects the light path internal to the crystal at an angle of approximately 45 degrees. Such different orientations between the plates 409 and beam displacers 404, 406, 407 produce different effects.

Figure 4B:
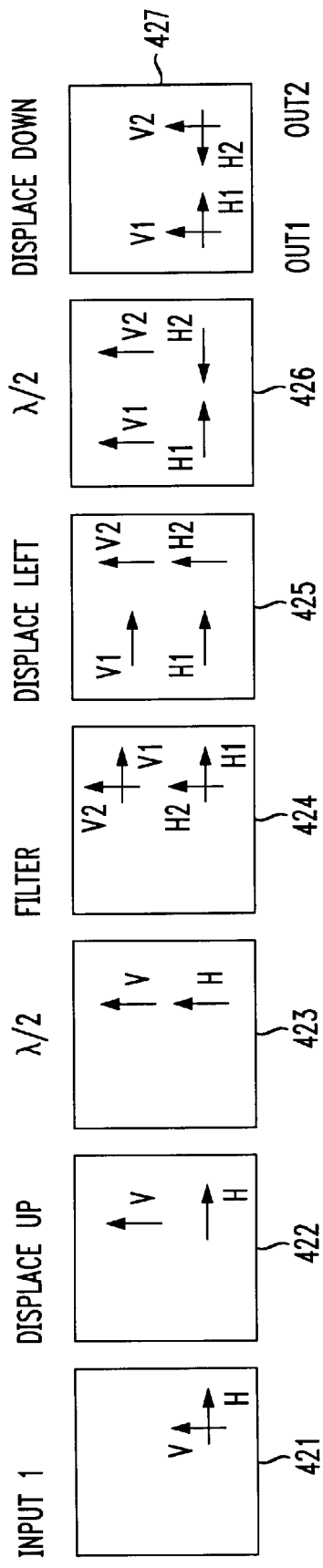

FIG. 4b shows a sequence of stick diagrams that illustrate the polarization and spatial evolution of the input beam 410. In general, the input optical beam 410 is elliptically polarized and thus has both horizontal H and vertical V components as shown in frame 421 of FIG. 4b. Note, for clarity in tracking the beams through the stick diagrams 421–427, all beam components which originated from the vertical component V of the input beam will maintain a V designation (e.g. V1 and V2) and, likewise, all beam components which originated from the horizontal component H of the input beam will maintain an H designation (e.g. H1 and H2). The beam components V and H in input beam 410 correspond to the previously discussed $\upsilon$ and $\eta$ axis polarization components of FIG. 2b, respectively.

The input beam displacer 404 splits the input beam 410 into two distinct beams 411 and 412, parallel and offset, where the beams are orthogonally and linearly polarized, frame 422.

The $\lambda/2$ wave plate 405 is positioned to rotate only beam 412; the resulting 90 degree polarization rotation in the lower beam is shown in frame 423.

The birefringent filter 401 produces one output beam 413 for each input beam 411, 412, frame 424. The polarization of the output beams 413 varies with the frequency of input beam 410. In general the state of polarization of either output beam 413 has horizontal and vertical polarization components, the relative strength of these components being dependent on the frequency of the input beam 410. Both beams output from filter 401, 413, have the same relative intensity of horizontal and vertical polarization components, since both beams 413 were derived from two beams input to filter 401 which have the same polarization, frame 423; however, the total power (V1+V2 vs. H1+H2) in either beam 413 is in general different.

The birefringent filter 401 in general produces polarization components V1 and H1 in frame 424, at the expense of components V2 and H2. Both beams 413 now have in general two orthogonal polarization components. The function of the output stage 403 is to combine the two horizontal components V1 and H1 onto one beam OUT1 and combine the two vertical components V2 and H2 onto one beam OUT2. In order to perform this function beam displacers 406 and 407, with checkerboard $\lambda/2$ plate 408, are used for this invention.

First, the horizontal and vertical components from frame 424 are separated by beam displacer 406, frame 425. Note that beam displacer 406 displaces laterally, compared to the vertical displacement of beam displacer 404. Note that beam displacer 406 may be the same as beam displacer 404 except that it has been rotated by 90 degrees. The checkerboard $\lambda/2$ plate 408 is arranged to rotate the polarization of beams in two diagonal quadrants (upper left V1 and lower right H2 of frame 425) and to not rotate the polarization in the remaining two quadrants. The change to frame 426 from frame 425 illustrates this effect. A last beam displacer 407 combines components V1 and H1, and V2 and H2, respectively. Note beam displacer 407 displaces vertically downwards, in opposition to beam displacer 404. Such a function requires only a 180 degree rotation between like crystals, 404 and 407, having the same length. Frame 427 illustrates the resultant construction of beams OUT1 and OUT2 from components V1, H1 and V2, H2.

FIG. 2b illustrated the frequency-dependent polarization response of a birefringent filter 401, given a linearly polarized input beam. Output stage 403 translates the frequency-dependent polarization response into amplitude response at outputs OUT1 and OUT2. Consider at relative frequency 0 GHz in FIG. 2b where the filter 401 output polarization is strongly horizontal and weakly vertical. Accordingly, components V1 and H1 in beams 413 illustrated in frame 424 are strong while components V2 and H2 are weak. Following through stage 403 to OUT1 and OUT2, OUT1 is accordingly intense and OUT2 is dim. At a different relative frequency, +/−100 GHz in FIG. 2b, the filter 401 output is strongly vertical and weakly horizontal. Following the same argument as before, components V2 and H2 are strong and V1 and H1 are weak, which translates to an intense OUT2 and dim OUT1. The sum of the powers on output ports OUT1 and OUT2 are always constant, conserving power at all frequencies. The relatively intensity between OUT1 and OUT2 varies periodically with frequency but is independent of input polarization in beam 410. The period of variation is the free-spectral range (FSR) of the birefringent filter 401.

Figure 5:
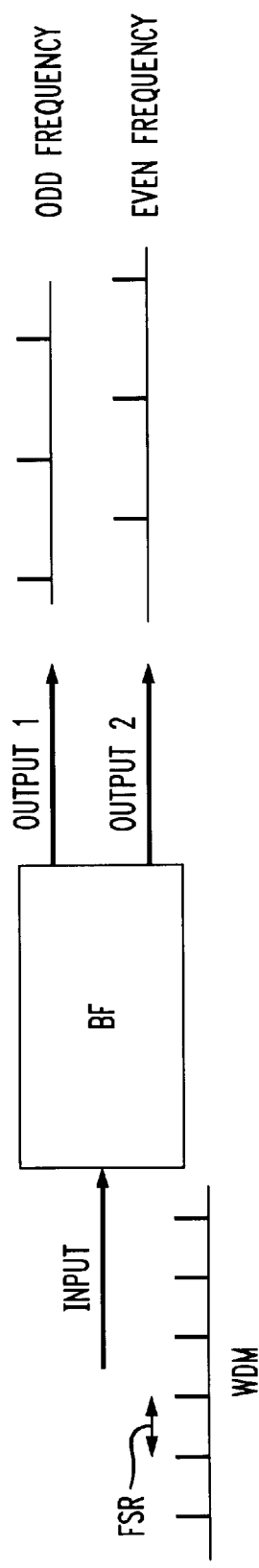

Provided an appropriate birefringent filter 401 design, the whole of the invention presented in FIG. 4a can be used as an interleaving filter. Consequently, with reference to FIG. 5, if the input signal is a wavelength division multiplexed (WDM) signal having uniformly spaced channels in frequency with period FSR, the birefringent filter is FIG. 4a (BF) 501 would de-interleave the WDM signal so that the odd numbered channels would be outputted at OUT1 and the even numbered channels would be outputted at OUT2.

It should be noted in FIG. 4a that while the $\lambda/2$ plate 405 is shown to intercept beam 412, the $\lambda/2$ could be positioned to intercept beam 411 instead. The result would be to exchange designation of OUT1 and OUT2. Alternatively, the checkerboard $\lambda/2$ plate 408 could intercept the complementary two beams in frame 425. A necessary consequent change would be to rotate beam displacer 407 by 180 degrees. The outputs OUT1 and OUT2 would then be spatially shifted upwards but not exchanged.

2×2 Birefringent Filter Design

Figure 6A:
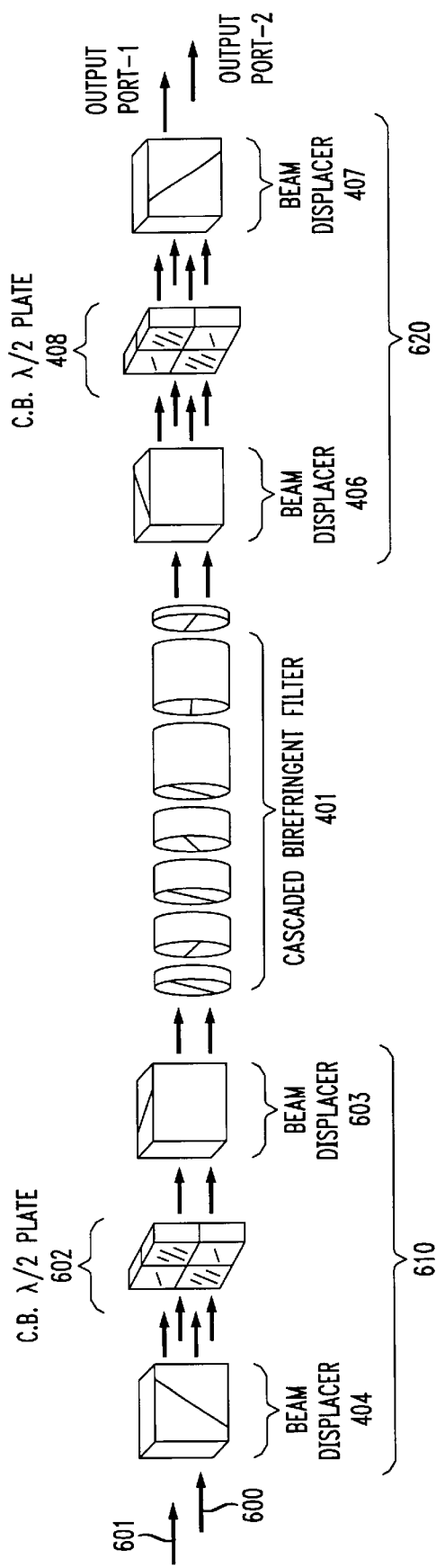
FIG. 6a. shows the periodic birefringent interleaver filter of FIG. 4a having two laterally separated input beams.

As an augmentation to the 1-input 2-output polarization-diversified birefringent filter as illustrated in FIG. 4a, FIG. 6a illustrates a 2-input 2-output polarization-diversified birefringent filter. A 2×2 port interleaving filter has many applications in optical transmission systems. The primary difference between the 1×2 filter and 2×2 filter, illustrated in FIGS. 4a and 6a respectively, is the input section. The 2×2 filter substitutes the sequence of components 610 for that in 402. However, sections 401 and 403 (420 here relabeled 620) remain the same.

Figure 6B:
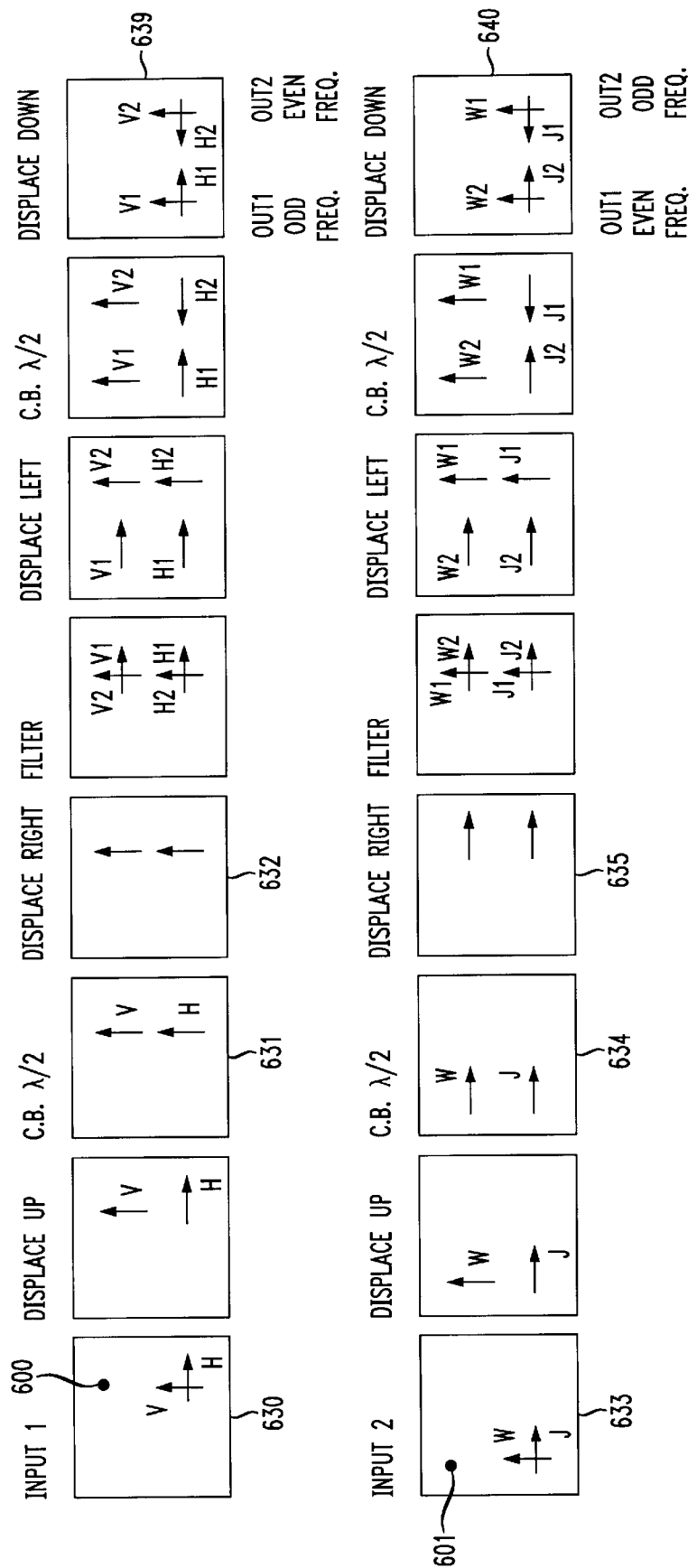
FIG. 6b shows a stick diagram illustrating beam locations and the relative beam intensity along the polarization axes at various locations of the filter in response to the two input beams.

The function of input stage 610 is to offer two distinct input ports 600 and 601 into the filter 401. The two beams presented into the birefringent filter 401 have vertical polarization components originating from input beam 600 (see FIG. 6b, frame 632) and horizontal components originating from input beam 601 (see FIG. 6b, frame 635), where the horizontal and vertical components of the two beams are spatially coincident.

Input stage 610 must possess polarization diversity so that the output response OUT1 and OUT2 are independent of the input 600 and 601 state of polarization. To realize this requirement, 610 uses first beam displacer 404, first checkerboard $\lambda/2$ waveplate 602, and second beam displacer 603, where beam displacers 404 and 603 are rotated 90 degrees with respect to each other. The stick diagrams in FIG. 6b follow the evolution of the polarization components and their spatial location through the filter. Following input beam 600 with arbitrary polarization components V and H, frame 630, the first beam displacer 404 vertically separates the components. Checkerboard $\lambda/2$ waveplate 602 selectively rotates the lower beam H. Beam displacer 603 performs lateral displacement to beams with polarization components not parallel nor perpendicular to the extraordinary axis of the displacer 603. As illustrated here, polarization components originating from input 600 are both vertical, and therefore transit the beam displacer 603 unaltered in location. Beams 632 are of the same polarization and spatial location as the V and H beams from FIG. 4b frame 423. Accordingly, the remaining transmission through stages 401 and 620 in FIG. 6a follow that of stages 401 and 403 of FIG. 4a.

Separately, following input beam 601 with arbitrary polarization components W and J, corresponding at the input plane to polarization components V and H of beam 600, frame 633, the first beam displacer 404 vertically separates the components. Checkerboard $\lambda/2$ waveplate 602 selectively rotates the upper beam W. Beam displacer 603 performs lateral displacement to beams with polarization components not parallel nor perpendicular to the extraordinary axis of the displacer 603. Accordingly, beams W and J in frame 634 are displaced by beam displacer 603 to positions in frame 635, which in the preferred embodiment are coincident with the V and H beam locations in frame 632. As a result, only two beams enter and exit the birefringent filter 401.

Figure 6C:
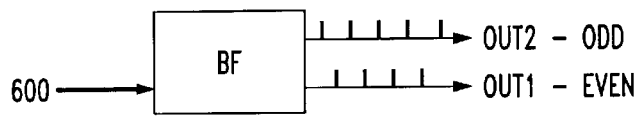
FIG. 6c shows how the output location of the even and odd channels changes as the input port where the input signal is applied changes.

The function of output stage 403 in FIG. 4a was to combine components V1, H1 and V2, H2 into two distinct output beams. The function of output stage 620 is the same, where specifically, (V1, H1) are combined to OUT1; (V2, H2) are combined to OUT2; (W1, J1) are combined to OUT2, and (W2, J2) are combined to OUT1. That is, at the output of filter 401, polarization components that originate from input beam 600 are mapped to outputs OUT1 and OUT2 for some frequency band, while polarization components that originate from input beam 601 are mapped to output OUT2 and OUT1 for the same frequency band. The order at the output is reversed. Accordingly, for an interleaving filter realization, odd and even channels from beam 600 are formed on OUT1 and OUT2 (see FIG. 6b, frame 639), respectively, while odd and even channels from beam 601 are formed on OUT2 and OUT1(see FIG. 6b, frame 640), respectively. Note that the output port of odd and even channels can be changed by changing the location of the input signal from input port 600 to 601, as is shown in FIG. 6c.

The relative orientation of the four beam displacer blocks 404, 603, 406, and 407 is critical to the correct performance of this device. The displacements must be in the order "up", "right", "left", "down", given the described position of the checkerboard l/2 plates. Taking the first beam displacer 404 to be oriented at 0 degree rotation about the direction of light propagation, the remaining beam displacers 603, 406, and 407 are rotated by +90 degrees, −90 degrees, and +/−180 degrees, respectively. The lengths of beam displacers 404 and 407 are necessarily the same. The lengths of beam displacers 603 and 406 are necessarily the same. The lengths of all beam displacers can be the same. Given these orientation requirements of the four beam displacers, the relative orientation of the two checkerboard $\lambda/2$ waveplates 602 and 408 must be the same.

A note on the philosophy of the input stage 610 is in order. It has been noted that the output stage 620 shuffles the output polarization axes into two physical output ports OUT1 and OUT2. For the input stage 610, it is necessary to maintain a feature that indicates whether the light beam into the filter proper originated from input 600 or 601. The innovation used here is that the light from input 1, 600, is spatially separated and then converted to purely vertical polarization, see frame 631. The light originating from input 2, 601, is also spatially separated but then converted into purely horizontal polarization, see frame 632. The filter responses to vertical and horizontal linear input polarization are mutually orthogonal, and in general elliptical rather than linear. Since the output polarizations are mutually orthogonal when originated from inputs 1 and 2, the output stage 620 shuffles the polarization outputs to the two physical output ports in an opposite order based on the input origination. This is why odd channels of input 1 go to OUT 1 while odd channels of input 2 go to OUT 2 and even channels of input 1 go to OUT 2 and even channels from input 2 go to OUT 1.

An important advantage of this scheme is found when the $\lambda/2$ plates are considered imperfect. An imperfect $\lambda/2$ plate is one where the rotation from one linear SOP to the other is incomplete, leaving residual optical power on the original polarization axis. Such imperfection may be due to misorientation, mis-cut of the plate thickness, and/or the chromatic dependence. The input 610 and output 620 stages as shown tend to reject light that is in the wrong polarization in the wrong place. The rejected light never recombines to the two physical output ports but remains in the $1^{st}$ and $2^{nd}$ quadrant, and to the left and right of the polarization square in which the principle light beams travel.

The Checkerboard $\lambda/2$ Plates Between the beam displacers of the input and output stages 610 and 620 are placed checkerboard (CB) $\lambda/2$ wave plates, 602 and 408, respectively. The purpose of these CB plates is to rotate the polarization of two diagonal quadrants of the four beams which transit the plate and to not rotate the polarization in the remaining two quadrants. In this way the polarizations of beams in the four quadrants are differentially rotated.

Figure 7A:
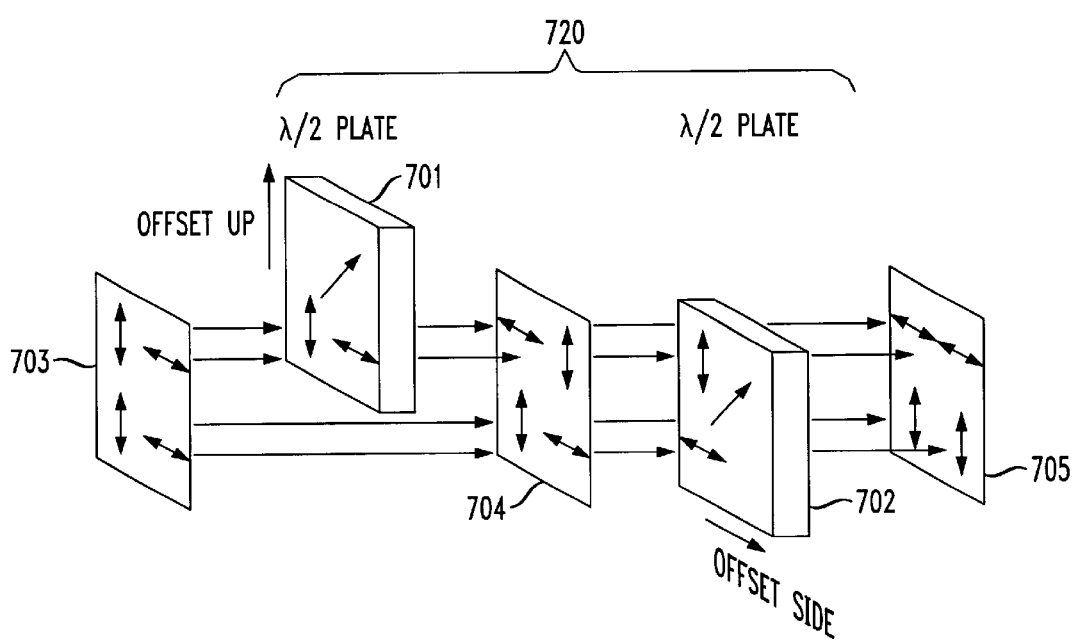
FIG. 7a shows a first embodiment of a λ/2 wave-plate arrangement.

Shown in FIG. 7a is a possible implementation 720 of a four-quadrant differential $\lambda/2$ wave plate formed by using two separate and monolithic $\lambda/2$ plates 701 and 702 in the following arrangement. The first $\lambda/2$ plate 701 intersects, say, the upper two beams within the four quadrants of beam frame 703. The second $\lambda/2$ plate 702 intersects, say, the right two beams of beam frame 704. The result is that the beams in the upper left and lower right corners of 703 are rotated once while the beam in the lower left corner is not rotated and the beam in the upper right corner is rotated twice. The number of rotations and interfaces the beams experience is different from corner to corner.

Figure 7B:
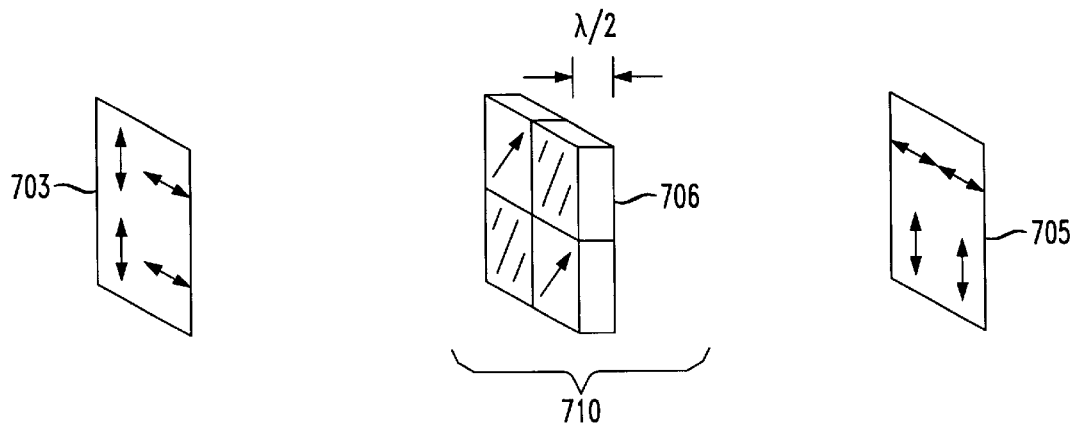
FIG. 7b shows an improved checkerboard λ/2 wave-plate arrangement.
Figure 9A:
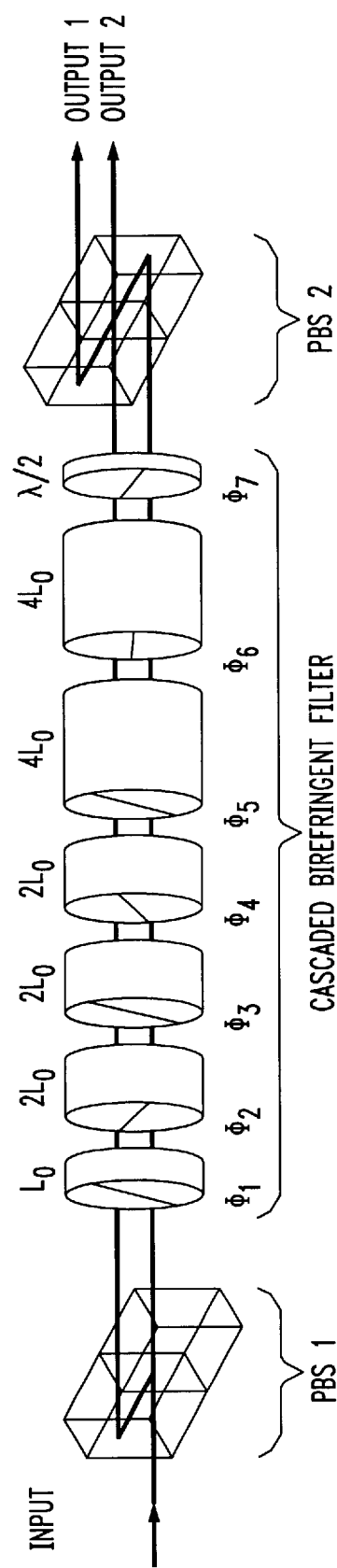
Figure 9B:
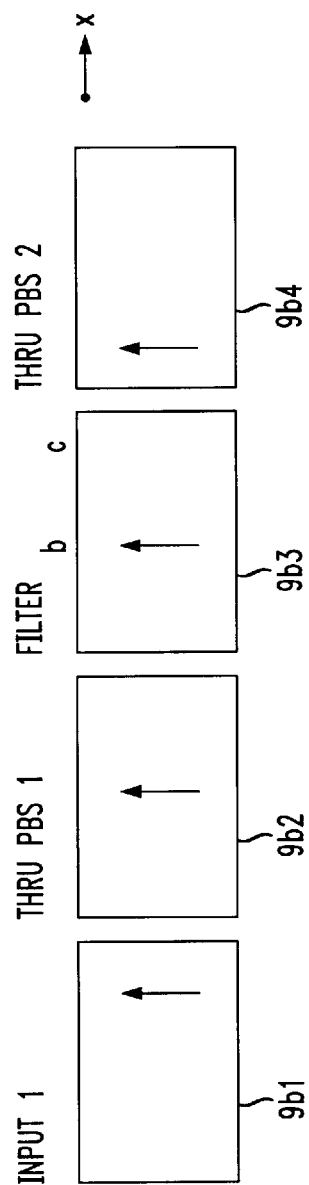
Figure 9C:
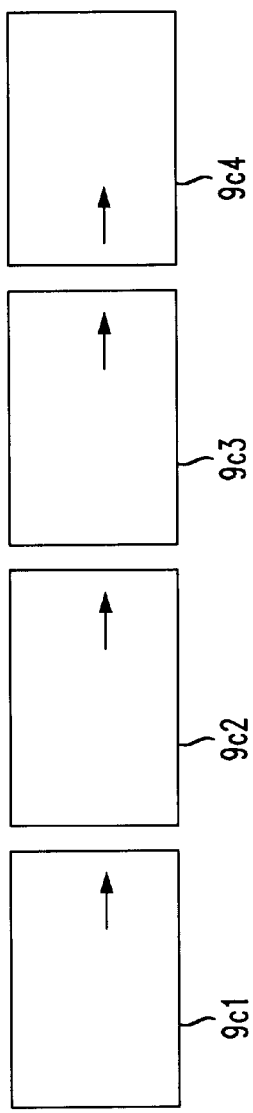
Figure 9D:
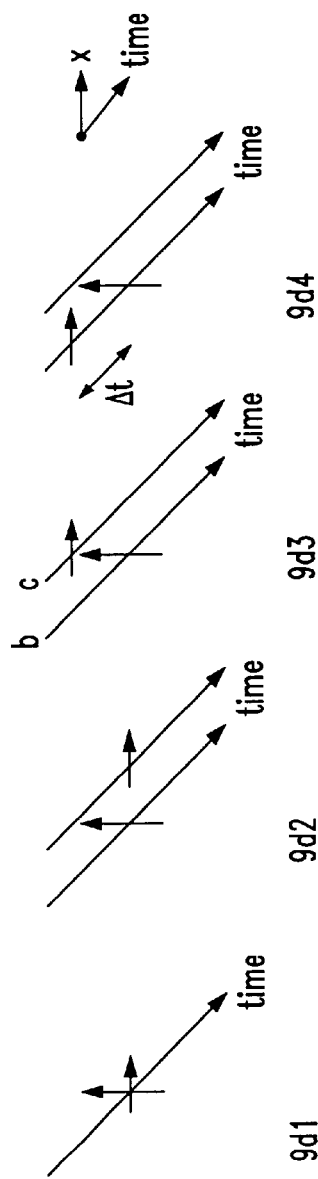

FIG. 7b shows a compact and the preferred manner in which to construct a four-quadrant differential $\lambda/2$ wave plate. This alternative is called the checkerboard $\lambda/2$ waveplate, or CB plate for sort. The CB plate can be constructed by cutting a monolithic $\lambda/2$ plate into square chips and by cutting a non-birefringent plate, such as fused quartz, into square chips of the same size. Then, two chips are taken from both the cut $\lambda/2$ plate and the cut non-birefringent plate and placed together in a 2×2 matrix checkerboard fashion. The chips can be cemented to a common backplane glass host. Alternatively, the two non-birefringent chips can be excluded, but the same 2×2 matrix must be formed with the birefringent chips.

The advantages of the CB plate over the construction illustrated in FIG. 7a are 1) the CB plate 710 intersects all beams once and only once, avoiding differential loss between the beams as they transit the interfaces; 2) the $\lambda/2$ polarization rotation in cross quadrants will be substantively the same because those two beams transit $\lambda/2$ plates that came from the same master plate; and 3) no double polarization rotation occurs, which can lead to over or under rotation in the presence of imperfections.

Third Inventive Implementation

A third inventive implementation of a polarization-diversified birefringent filter is illustrated in FIG. 8a. This implementation is closely related to the Buhrer invention but retains a feature present in the first and second inventive implementations described in this patent. Unlike the Buhrer patent, $\lambda/2$ waveplates 801 and 802 and added to intersect the light paths 304 and 305'. In this way the input apparatus consists of PBS 1 and $\lambda/2$ waveplate 801, and the output apparatus consists of PBS 2 and $\lambda/2$ waveplate 802. Note that $\lambda/2$ waveplate 801 may intersect either beams 304 or 305, and $\lambda/2$ waveplate 802 may intersect either beams 304' or 305'; the preferred implementation is where only one $\lambda/2$ waveplate intersects each beam 304/304' and 305/305'.

Addition of $\lambda/2$ waveplates 801 and 802 corrects a polarization-dependent dispersive response induced by the birefringent filter 803 that is otherwise present in the Buhrer invention. Recall the intention of the inventive input and output apparatus of this patent covered so far: polarization diversity is utilized so that the output intensity response from the filter is dependent only on the frequency and not the polarization state of the input light. Tacitly present, but of equal importance, the output phase response from the filter must be dependent only on frequency and not the polarization state of the input light. The 1×2 and 2×2 filter implementations disclosed thus far within this patent do satisfy this more complete specification of output intensity and phase response independence on the input polarization state. The scheme employed by Buhrer [6] does not provide for phase independence. The modified scheme illustrated in FIG. Ba does provide for phase independence.

FIG. 9 duplicates FIG. 3 but adds qualitatively information relating to the temporal, and therefore phase, response of the birefringent filter. FIG. 9a illustrates the Buhrer scheme with no modification; FIGS. 9 (b–c) present stick figures that indicate the polarization and spatial evolution of the light through the filter; FIG. 9d adds the temporal response of the filter. FIGS. 9 (b–c) illustrates the particular case where there is an input frequency that transforms vertical polarization into vertical polarization (frames 9b1 to 9b4), and correspondingly transforms horizontal polarization into horizontal polarization (frame 9c1 to 9c4). That is, there is a null effect on the polarization state. However, detailed analysis reveals a complex-conjugate phase response between the two polarization states as output from the birefringent filter proper, which in turn results in a differential temporal delay between the two output polarization states (compare frame 9d3 to 9d2). The recombination by PBS 2 of orthogonal polarization states results in two temporal components which are mutually offset in time (frame 9d4). The polarization-diversified filter illustrated in FIG. 9a is therefore not insensitive to the input state of polarization with respect to phase response.

As a practical matter, differential delay between orthogonal polarizations for a single interleaving birefringent filter may not lead to substantial system impairments. However, a cascade of like filters will lead to accrued impairments. Alternatively, more sophisticated birefringent filter designs which transmit over a very narrow bandwidth compared to the FSR of the filter requires many more stages than currently used in practice. Accordingly, the differential delay from one such filter alone may exhibit substantial differential delays. Since the mitigation of this effect is simple, it is important to avoid this impairment.

Figure 10C:
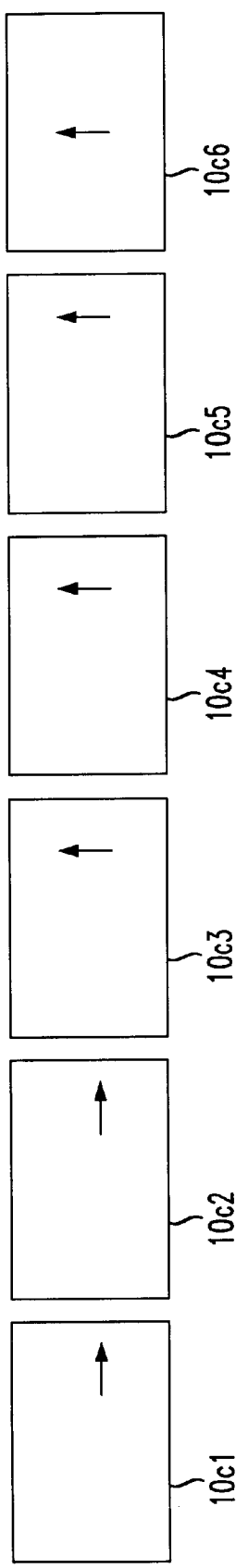
Figure 10D:
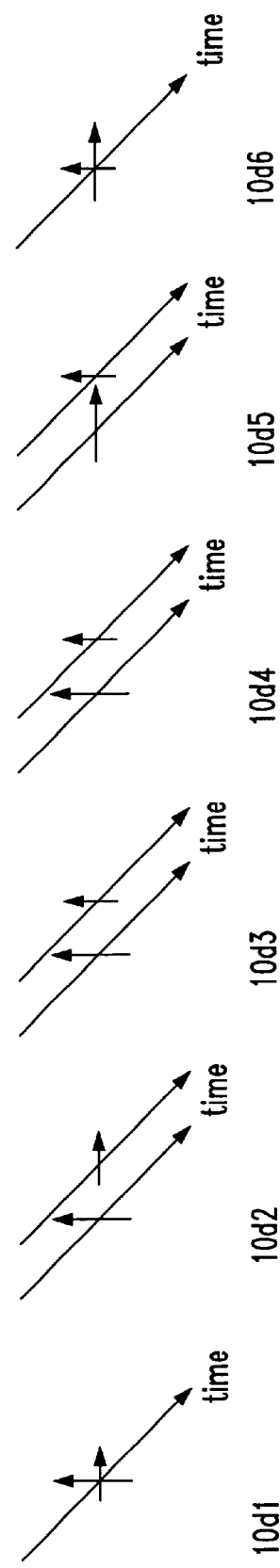

FIG. 10a illustrates our modified scheme. FIGS. 10 (b–c) present stick figures similar to FIGS. 9 (b–c), and FIG. 10d presents temporal diagrams. While an exemplar polarization, spatial, and temporal evolution through the filter of FIG. 10a is presented in these figures, the critical aspect is the input polarization states to the filter 1002. Frames 10b3–10c3 illustrate that the polarization state on the two distinct beams input to filter 1002 have been orientated parallel. Transit through the filter transforms the polarization state according to the frequency of the input, but does not induce a differential time delay at the output of filter 1002, see frame 10d4. The absence of differential delay derives from the excitation of filter 1002 on the two distinct beams being of the same, rather than orthogonal, polarizations. Following the stick diagrams through PBS 2 to frame 10d6 indicates that this polarization diversity scheme combines the output polarizations with no time delay.

Results

Our birefringent filters of FIGS. 4a, 6a, and 8a exhibit a particularly good response. The filter loss can be low, lower than 0.1 dB per stage. With appropriate filter synthesis and number of stages, a sharp, flat filter response is achievable. The phase response is excellent compared with Fabry-Perot or Fiber Bragg Grating filters because the impulse response is of finite and short duration.

When our birefringent filter is used in optical communication applications, polarization insensitive must be optimized. In doing so, a crosstalk floor should not be added if possible. Buhrer demonstrated the use of two special PBS stages, one each for input and output, to create a polarization insensitive filter. The crosstalk floor for good PBS elements is currently about −30 dB. These stages are also relatively achromatic.

In comparison, our birefringent interleaver filter of FIGS. 4a and 6a reduces the crosstalk floor to 40 dB or better from −30 dB and are substantively more achromatic. Additionally our filters of FIGS. 4a, 6a, and 8a substantively eliminate polarization dependent loss In addition, the input and output stage(s) scheme presented herein exhibits tolerance to imperfection of the requisite $\lambda/2$ plates.

One application of our birefringent interleaver filters is in increasing the number of WDM channels that can be processed in optical demultiplexers and demultiplexers which utilize Arrayed-Waveguide Routers (AWG). As described for FIG. 5, for a given AWG frequency resolution capability, the frequency spacing of WDM channels presented to an AWG based multiplexer and/or demultiplexer can be doubled if the channels are first filtered by our birefringent interleaver filter to separate even and odd WDM channels which are then processed by separate AWGs.

What has been described is merely illustrative of the application of the principles of the present invention. Other methods and arrangements can be implemented by those skilled in the art without departing from the spirit and scope of the present invention.

Appendix

References

[1] B. Loyt, Comptes Rendus vol. 197, pp. 1593, 1933.
[2] J. Evans, J. Opt. Soc. Amer., vol. 39, no. 3, pp. 229, 1949.
[3] I. Solc, Czech. J. Phys. vol. 3, pp. 366, 1953.
[4] S. Harris, J. Opt. Soc. Amer., vol. 54, no. 10, pp. 1267, 1964.
[5] C. Buhrer, Applied Optics, vol. 26, no. 17, pp. 3628, 1987; Applied Optics, vol. 27, no. 15, pp. 3166, 1988; Applied Optics, vol. 33, no. 12, pp. 2249, 1994.
[6] U.S. Pat. No. 4,987,567, issued to C. Buhrer on Jan. 22, 1991.

What is claimed is:

1. A birefringent filter comprising
   an input optical apparatus for receiving an input optical beam and producing therefrom parallel first and second polarized optical beams offset in a first direction and having the same polarization;
   a birefringent filter for receiving the first and second polarized optical beams and producing therefrom a first and second elliptically polarized optical beams, each including first and second beam components having inversely varying intensities which vary periodically, over a predefined free-spectral range, with the frequency of the input optical beam; and
   an output optical apparatus for receiving the first and second elliptically polarized optical beams and for combining together the first beam components of the first and second elliptically polarized optical beams to form a first elliptical polarized output beam and for combining together the second beam components of the first and second elliptically polarized optical beams to form a second elliptical polarized output beam.

2. The birefringent filter of claim 1 wherein
   the input optical apparatus includes
   a polarization beam-splitter, PBS, for receiving the input optical beam and producing therefrom parallel first and second optical beams offset in a first direction and of orthogonal polarization, and
   a $\lambda/2$ plate for rotating the polarization of the first beam to be the same polarization as the second beam; and wherein
   the output optical apparatus includes
   a $\lambda/2$ plate for rotating the polarization of the second elliptically polarized beam; and
   a PBS for receiving the first and rotated second elliptically polarized beams and for combining together the first axis beam components of the first and second elliptically polarized optical beams to form a first elliptical polarized output beam and for combining together the second axis beam components of the first and second elliptically polarized optical beams to form a second elliptical polarized output beam.

3. The birefringent filter of claim 1 wherein
   the input optical apparatus includes
   a beam displacer for receiving the input optical beam and producing therefrom parallel first and second optical beams offset in a first direction and of orthogonal polarization,
   a $\lambda/2$ plate for rotating the polarization of the first beam to be the same polarization as the second beam; and wherein
   the output optical apparatus includes
   a beam displacer for receiving the first and second elliptically polarized beams and for displacing a first component the first and second elliptically polarized beams in a second direction, orthogonal to the first direction,
   a two-by-two plate having a $\lambda/2$ plate in two diagonal locations thereof, so that a first component of the first elliptically polarized optical beam and the second component of the second elliptically polarized optical beam are rotated; and
   a second beam displacer for receiving the first rotated component of the first elliptically polarized optical beam and the first component of the second elliptically polarized optical beam are displaced in a third direction opposite to the first direction so as to combine the displaced first rotated component and the second component of the first elliptically polarized optical beam to form a first elliptical polarized output beam and to combine the first rotated component and the displaced second component of the second elliptically polarized optical beam to form a second elliptical polarized output beam.

4. The birefringent filter of claim 3 wherein the first beam displacer includes a sheet polarizer added on one surface thereof so as to intersect either the first or second beam.

5. The birefringent filter of claim 3 wherein the first beam displacer is constructed using materials selected from a group including calcite and rutile, yttrium ortho-vanadate, alpha-barium borate, and lithium niobate.

6. The birefringent filter of claim 3 wherein the first beam displacer is constructed using two rhombic prisms attached to each other to form a rhombus shape.

7. The birefringent filter of claim 3 wherein the crystal cut of the first and second beam displacers is different from that of birefringent plates used in the linearbirefringent filter.

8. The birefringent filter of claim 1 wherein the input optical apparatus includes a first beam displacer for receiving a second input optical beam, horizontally displaced from the first input optical beam, and producing therefrom parallel first and second optical beams displaced in an upward direction and having orthogonal polarization, a first two-by-two checkerboard patterned $\lambda/2$ plate having two $\lambda/2$ plate elements located along a first diagonal location thereof, so as to intercept and rotate by 90 degrees the upper left and lower right beam components received from the first beam displacer; and a second beam displacer for receiving from the first two-by-two plate both components of said input beam and for transmitting said input beam components undisturbed, and for receiving from the first two-by-two plate both components of the second input beam and displacing both components so as to substantively overlap said input beam components; and wherein the output optical apparatus includes a first output beam displacer for receiving the first and second elliptically polarized beams and for displacing left a first component the first and second elliptically polarized beams, a first out two-by-two plate for rotating by 90 degrees the upper left and lower right beams received from the first output beam displacer; and a second output beam displacer for displacing down beam components received from the first output two-by-two plate so as to form the first elliptical polarized output beam and the second elliptical polarized output beam.

9. The birefringent filter of claim 8 wherein the first beam displacer includes a sheet polarizer added on one surface surface thereof so as to intersect either the first or second beam.

10. The birefringent filter of claim 8 herein the first beam displacer is constructed using materials selected from a group including calcite and rutile, yttrium ortho-vanadate, alpha-Barium Borate, and Lithium niobate.

11. The birefringent filter of claim 8 wherein the first beam displacer is constructed using two rhombic prisms attached to each other to form a rhombus shape.

12. The birefringent filter of claim 8 wherein at least one of the first and second two-by-two-plates are formed using two birefringent units mounted in-a diagonal pattern onto a common glass plate; wherein the birefringent axes of the two birefringent units are aligned; wherein the birefringent axes of the two birefringent units point in the direction of the diagonal pattern formed.

13. The birefringent filter of claim 8 wherein at least one of the first and second two-by-two plates are formed using a first plate that intersects the two upper beam components and a second plate that intersects the two right side beam components which impinging thereon.

14. The birefringent filter of claim 8 wherein the extraordinary axis of the beam displacer crystal is inclined by substantively 45 degrees to the propagation direction of the optical beam.

15. The birefringent filter of claim 1 wherein the linear birefringent filter is constructed using materials selected from a group including quartz, calcite, and rutile, yttrium ortho-vanadate, alpha-Barium Borate, and Lithium niobate.

16. The birefringent filter of claim 1 being a demultiplexer used to demultiplex an input wavelength division multiplexed (WDM) signal into a first elliptical polarized output beam including even wavelenths of the WDM signal and a second elliptical polarized output beam including odd wavelenths of the WDM signal.

17. A birefringent filter comprising an input optical apparatus for receiving an input optical beam and producing therefrom two parallel, offset, and orthogonally polarized first and second optical beams;

a first $\lambda/2$ plate for rotating the polarization of the first beam to be the same polarization as the second beam;

a birefringent filter for receiving the rotated first beam and the second beam and producing therefrom a first and second elliptically polarized beams, respectively, each including first and second beam components having inversely varying intensities which vary periodically, over a predefined free-spectral range, with the frequency of the input optical beam;

a second $\lambda/2$ plate for rotating the polarization of the second elliptically polarized beam; and an output optical apparatus for receiving the first and rotated second elliptically polarized beams and for combining together the first beam components of the first and second elliptically polarized optical beams to form a first elliptical polarized output beam and for combining together the second beam components of the first and second elliptically polarized optical beams to form a second elliptical polarized output beam.

18. A method of operating a birefringent filter comprising the steps of:

receiving an input optical beam and producing therefrom parallel first and second optical beams offset in a first direction and having the same polarization;

receiving the first and second polarized optical beams and producing therefrom a first and second elliptically polarized optical beams, each including first and second beam components having inversely varying intensities which vary periodically, over a predefined free-spectral range, with the frequency of the input optical beam; and combining together the first beam components of the first and second elliptically polarized optical beams to form a first elliptical polarized output beam and combining together the second beam components of the first and second elliptically polarized optical beams to form a second elliptical polarized output beam.

19. A method of operating a birefringent filter comprising the steps of:

receiving a first input optical beam and producing therefrom two parallel, offset, and orthogonally polarized first and second optical beams;

rotating the polarization of the first beam to be the same polarization as the second beam;

producing from the rotated first beam and the second beam a first and second elliptically polarized beams, respectively, each including first and second beam components having inversely varying intensities which vary periodically, over a predefined free-spectral range, with frequency of the input optical beam;

rotating the polarization of the second elliptically polarized beam; and combining together the first beam components of the first and second elliptically polarized optical -beams to form a first elliptical polarized output beam and combining together the second beam components of the first and second elliptically polarized optical beams to form a second elliptical polarized output beam.

20. A method of operating a birefringent filter comprising the steps of:

receiving a first input optical beam and producing therefrom two parallel, offset, and orthogonally polarized first and second optical beams;

rotating the polarization of the first beam to be the same polarization as the second beam;

receiving a second input optical beam horizontally displaced from the first input optical beam and producing therefrom two parallel, offset, and orthogonally polarized third and fourth optical beams;

rotating the polarization of the fourth beam to be the same polarization as the third beam;

producing from the rotated first beam and the second beam first and second elliptically polarized beams, respectively, each including first and second beam components having inversely varying intensities which vary periodically, over a predefined free-spectral range, with frequency of the input optical beam;

producing from the third beam and the rotated fourth beam third and fourth elliptically polarized beams, respectively, each including first and second beam components having inversely varying intensities which vary periodically, over a predefined free-spectral range, with frequency of the input optical beam;

combining together the first beam components of the first and second elliptically polarized optical beams to form a first elliptical polarized output beam and combining together the second beam components of the first and second elliptically polarized optical beams to form a second elliptical polarized output beam; and combining together the first beam components of the third and fourth elliptically polarized optical beams to form a third elliptical polarized output beam and combining together the second beam components of the third and fourth elliptically polarized optical beams to form a fourth elliptical polarized output beam.

* * * * *